United States Patent [19]

DeSalvo

[11] 4,019,919
[45] Apr. 26, 1977

[54] FULL STRENGTH, LOW DENSITY CONCRETE

[76] Inventor: Joseph L. DeSalvo, 23509 Ridge Road, Westlake, Ohio 44145

[22] Filed: Mar. 23, 1976

[21] Appl. No.: 669,685

[52] U.S. Cl. .................................. 106/90; 106/97; 260/29.6 S
[51] Int. Cl.$^2$ ...................... C04B 7/02; C04B 7/35
[58] Field of Search ............ 106/90, 97; 260/29.6 S

[56] References Cited

UNITED STATES PATENTS

| | | | |
|---|---|---|---|
| 3,272,765 | 9/1966 | Sefton .................................. | 106/90 |
| 3,869,295 | 3/1975 | Bowles et al. ........................ | 106/90 |
| 3,883,359 | 5/1975 | Harvey ................................. | 106/98 |

*Primary Examiner*—J. Poer

[57] ABSTRACT

A full strength, low density concrete is disclosed. The concrete utilizes polyethylene particles for some or all of the aggregate. The particles have a roughened, greatly uneven surface with extreme variations in contour on a macro scale.

2 Claims, No Drawings

FULL STRENGTH, LOW DENSITY CONCRETE

BACKGROUND OF THE INVENTION

This invention relates generally to concrete, and more particularly to a full strength, low density concrete composition which is especially resistant to cracking and method of making the same.

In the past, there have been many different proposals for making a low density concrete. All of these, however, have resulted in certain serious drawbacks, and hence none have been totally successful. One of the principal ways of approaching the manufacture of low density concrete has been the entrainment of gas or air or some type of an expanded particle as a portion or all of the aggregate. This may take the form of actually whipping the concrete to entrain small air bubbles, or it may take the form of additions of certain open cellular or closed cellular material or may take the form of adding certain chemical substances which upon application of heat and/or reaction agents to liberate a gas. Examples of these are found in U.S. Pat. Nos. 3,272,765 and 3,021,291. These approaches have not been entirely successful, due to several factors. First, the utilization of a more porous material allows for the soaking up of water, which can freeze and cause cracking of the concrete. Also, other disadvantages include the necessity to closely control the additions and certain of the processing conditions in order to obtain the desired results. Other problems include the handling of various reagents, the mixing of reagents and the like, such that the utilization of this type of concrete has been somewhat limited to special circumstances with special handling equipment.

There also have been several attempts to form decorative concrete structures, such as by adding colored chips of natural or synthetic material. While there has been a certain amount of success in obtaining decorative effects this way, nevertheless, the resulting concrete is of a much reduced strength, and generally usable only for minimal structural applications, such as surface facing. Also, with the use of decorative types of material there has often been encountered severe cracking problems of the concrete. Examples of the use of additional material as decorative use in concrete may be found in U.S. Pat. No. 3,778,290.

Further conventional prior art practice utilizing natural aggregate has resulted in somewhat erratic results in the final product due to unwanted impurities in the aggregate while often manifesting itself as cracking or other deficiencies in the final concrete product.

While all these different prior art techniques have found certain limited application, nevertheless, none of them has provided a low density, full strength structural concrete which is resistant to cracking.

SUMMARY OF THE INVENTION

According to the present invention, an improved, full strength, low density concrete composition having excellent resistance to cracking is provided which includes a mix of cement, sand, and aggregate, the aggregate including polyethylene particles. The particles have a roughened, greatly uneven surface, with extreme variations in contour thereof on a macro scale to provide a suitable bonding interlocking action with the cement. The resulting structure is a lower density concrete which is resistant to cracking and having full strength of at least 2700 lbs. per square inch.

DESCRIPTION OF THE PREFERRED EMBODIMENT

The present invention is concerned with the provision of a full strength, reduced density concrete which is suitable for structural as well as decorative application. The invention is also concerned with very closely controlling the exact composition of a concrete structure so as to provide the uniformity of structure and characteristics in a concrete structure by minimizing the possibility of inclusion of unintended, unwanted materials which can and often do introduce impurities along with the aggregate, and thus reduce the propensity for cracking. In this respect, it is well known that natural aggregate, even through washed several times, may actually contain small amounts of various types of impurities. While many times these small amounts of impurities are not always harmful, nevertheless, there are some instances where even low amounts of impurities contribute to erretic and undesirable end results in the strength and structural integrity of the concrete.

The present invention overcomes the defects of the prior art by utilizing as either part or all of the aggregate polyethylene particles. To get the full maximum benefit of the present invention, it is desirable to use the entire aggregate as polyehtylene particles, although certainly some benefit can be obtained, even with small amounts of aggregate, it being extremely desirable to use at least 20% of these polyethylene particles. While various types and grades of polyethylene may be utilized, it has been found that one very well suited and thus preferable type of polyethylene particles is marketed as polyethylene pellets blend No. 7382, by Union Carbide and Carbon Corp. Pellets of this blend were melted together, and from the mass, individual particles were formed by hand with a pair of knives, which particles had rough, greatly uneven surfaces, with extreme variations in contour thereof on a macro scale. (As used herein, the term particles includes all sizes up to and including the larger sizes of natural aggregate used in concrete.) It has been found that it is absolutely essential that the surfaces of the particles have this very uneven roughened shape in order to provide proper interlocking with the concrete. It was found that if the polyethylene particles had smooth, even surfaces such as conventional pellets, a proper bonding or internal locking between the concrete and the particles would not take place, and thus the concrete would not properly set up to a uniform solid of high strength. Rather, the particles would not be bonded therein, but would be loose and would provide no strength within the resulting concrete structure. Indeed, the resulting structure with smooth surface pellets has a strong propensity to crumble. Hence, one of the things that has been found to be absolutely essential is this extremely irregular, roughened surface to provide a bonding, interlocking action with the concrete. In fact, the more uneven and roughened and irregular in shape on a macro scale that the particles are, the better they perform. When particles of this necessary and desired surface configuration are utilized, the resulting structure is an extremely strong full strength, but reduced density concrete structure. Three test samples were made, two with a concrete structure utilizing conventional portland cement, and as aggregate, 100% polyethylene particles of the roughened, uneven, irregular shaped configuration formed as directed above from Union Carbide and Carbon Corp. blend No. 7382, and one control sample with no aggregate. These three samples were tested for compressive strength and the results are as follows:

Test 1. 2730 lbs. per square inch
Test 2. 2860 lbs. per square inch
Test 3. 3070 lbs. per square inch The cement used in each test was Medusa white Portland Cement, non-staining and the sand was Quality PGS sand silica. The mix proportions by volume were as follows:

| Test 1 | Wt. 3 lbs. | |
|---|---|---|
| Cement | | 1¼ cups |
| Sand | | 2 cups |
| Aggregate | | 2 cups |
| Water | | ⅔ cup |
| Test 2 | Wt. 3 lbs. | |
| Cement | | 2½ cups |
| Sand | | 2½ cups |
| Aggregate | | 1½ cups |
| Water | | 1¼ cups |
| Test 3 | 3¼ lbs. | |
| Cement | | 1½ cups |
| Sand | | 3 cups |
| Aggregate | | 0 |
| Water | | 1¼ cups |

These tests were standard three inch test cylinders cured about one month. As can be seen, the variations in strengths are minimal with and without aggregate. These tests show very clearly that a full strength concrete is provided, utilizing polyethylene particles, according to this invention.

When the aggregate consists entirely or 100% of the polyethylene particles, it has been found that the weight for a comparable volume utilizing conventional aggregate is approximately 25% less. Thus a weight saving of approximately 25% can be realized with no compromise in structural quality. Also, when the entire aggregate consists of polyethylene particles, there is no danger of extraneous unwanted material being introduced, as in the case when natural aggregate is introduced. As explained above, even with repeated washings, a certain amount of unwanted foreign material is carried by the aggregate and can be introduced into the cement with certain harmful and deleterious effects. Also, with 100% polyethylene particles, there is virtually no propensity for cracking under normal use conditions of concrete.

Of course, it is possible to not utilize the polyethylene particles as the entire aggregate charge, and indeed substantial benefits can be obtained even with as little as 20% or even less of polyethylene particles as aggregate. The polyethylene will serve the function of reducing the density and also the particles will add a very definite decorative effect. It is certainly possible if one desires, to utilize various colored polyethylene particles rather than a conventional polyethylene which will add even increased decorative effect without sacrificing any strength and still reduce the weight.

The concrete produced according to this invention also has the added advantage over many of the prior art lightweight concretes in that it is extremely resistant to cracking due to freezing conditions in the presence of water. Tests were performed by casting standard test cylinders of the type indicated above in the table, soaking them in water for 24 hours and then freezing them for a period of approximately three months. After the three month freezing period, the cylinders were thawed, soaked again, and refrozen, and this cycle repeated several times. Through this entire cycle and with temperatures down to 0° Farenheit, no cracking was observed. Thus, while a lighterweight structure is provided, nevertheless, a structure which is highly resistant to cracking due to freezing water is also provided.

Another unexpected benefit was obtained by utilizing polyethylene particles of this invention, and that was substantially improved acoustical properties. In audio acoustical tests, concrete formed according to this invention with 100% polyethylene particles for aggregate had greatly reduced sound reflecting properties compared to concrete utilizing conventional natural aggregate.

A still further unexpected benefit is facility with which nails can be driven into the structure of this invention. The polyethylene makes an excellent receptor of nails. Hence, concrete formed according to this invention can be used in applications where nailing is essential or desirable.

The concrete of this invention is very highly versatile in its uses, in that it may be cast on a job site in conventional form, it may be precast, or it may be applied as a surface layer or it may be utilized in any other method that conventional full density concrete is utilized. There are no complicated chemical reactions that have to take place to provide the lower density, nor are there any controlled setting conditions over what is normally required with conventional concrete. In fact, the polyethylene material can virtually be substituted as an equivalent of the conventional aggregate in essentially all respects and result in a full density reduced weight decorative concrete which is resistant to cracking due to freezing water is provided.

It is to be understood that the Portland cement used in the test is merely one type of cement that can be used. The invention is in that the polyethylene chips can be substituted for part or all of the aggregate in any type of concrete where conventional aggregate is used presently.

What is claimed is:

1. A high strength concrete composition, said concrete having a binder phase of cement, and an aggregate phase made up at least in part of polyethylene particles, said polyethylene particles having substantially roughened and greatly uneven surfaces with extreme variations in contour thereof on a macro scale, said concrete having an average composition strength of at least 2700 lbs. per square inch, said concrete including said polyethylene particles being substantially free of entrained gas.

2. The composition of claim 1 wherein the polyethylene particles comprise substantially the entire aggregate phase.

* * * * *